US006916112B2

(12) United States Patent
Holmquist et al.

(10) Patent No.: US 6,916,112 B2
(45) **Date of Patent: *Jul. 12, 2005**

(54) LIGHT EMITTING DEVICE PROVIDING A COLLIMATED LIGHT BEAM

(75) Inventors: Thomas W Holmquist, Fort Collins, CO (US); Ron L. King, Loveland, CO (US); Dean J. Geilenkirchen, Windsor, CO (US); John T. Meredith, Greeley, CO (US); Walter M. Wang, Greeley, CO (US); David W Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/612,865

(22) Filed: Jul. 2, 2003

(65) Prior Publication Data

US 2004/0027838 A1 Feb. 12, 2004

Related U.S. Application Data

(63) Continuation of application No. 09/670,467, filed on Sep. 26, 2000, now Pat. No. 6,752,525.

(51) Int. Cl.[7] .................................................. F21V 7/04

(52) U.S. Cl. ....................... 362/551; 362/581; 362/335; 362/188; 362/377

(58) Field of Search ................................ 362/551, 581, 362/335, 188, 276, 326, 377, 577, 578, 579; 385/33, 43, 93

(56) References Cited

U.S. PATENT DOCUMENTS 6,752,525 B1 * 6/2004 Holmquist et al. ......... 362/551

* cited by examiner

*Primary Examiner*—Sandra O'Shea
*Assistant Examiner*—Bertrand Zeade

(57) ABSTRACT

A light emitter is disclosed herein. An embodiment of the light emitter comprises a tube, a first aperture, a second aperture, a lens, a base mechanism, and a light path. The tube has a first end and a second end. The first aperture is located proximate the tube first end and the second aperture is located proximate the tube second end. The lens is located within the tube. The base mechanism is attached to the tube first end and has a cavity formed therein. The light path extends between the cavity and the second aperture and passes through the first aperture and through the lens.

45 Claims, 6 Drawing Sheets

LIGHT EMITTING DEVICE PROVIDING A COLLIMATED LIGHT BEAM

This application is a continuation of U.S. patent application, Ser. No. 09/670,467 filed Sep. 26, 2000, now U.S. Pat. No. 6,752,525 which is hereby incorporated by reference for all that is disclosed therein.

BACKGROUND

Light sensors are used in many applications to detect the presence of objects. A light sensor typically has a light emitter that emits light and a light receiver that receives and detects the light emitted by the emitter. The emitter and receiver are placed across a region where the detection of objects is sought, which creates a light path between the emitter and the receiver. When an object enters the region, the object interrupts the light path between the emitter and the receiver, which is detected by associated electronics. The light sensor then transmits an indication that an object is located in the region.

One use of light sensors is in an autochanger. An autochanger is a mass data storage device having a plurality of media pieces and media players located therein. The media pieces are retained within the autochanger in a plurality of media holding bays. A media handling device, sometimes referred to as a picker, transports the media pieces between the holding bays and the media players. In order to decrease the size of the autochanger, the picker operates in close proximity to the holding bays and, thus, the media pieces. In the event a media piece becomes dislodged from its media holding bay, the picker will likely collide with the media piece. This collision may damage the picker, the media piece, and other components within the autochanger. Examples of autochangers are illustrated in U.S. Pat. No. 5,043,962 of Wagner et a. for CARTRIDGE HANDLING SYSTEM and U.S. Pat. No. 5,719,833 of Jones for APPARATUS FOR SECURING A CARTRIDGE ENGAGING ASSEMBLY WITHIN A CARTRIDGE HANDLING SYSTEM, both of which are hereby incorporated by reference for all that is disclosed therein.

In order to assure that the media pieces have not become dislodged from the media holding bays, a light sensor is used to detect the presence of media pieces and other obstructions in the path of the picker. A light emitter emits a beam of light in front of the media pieces and a receiver detects the light. Accordingly, a light path is formed between the emitter and the receiver and adjacent the media holding bays. In the event that a media piece becomes dislodged, it will cross the light path, disrupting the light beam. This disruption is sensed by the receiver and transmitted to a processor within the autochanger. An indicator may be displayed to notify an operator of the problem. Additionally, the autochanger may function in a manner that prevents the picker from traveling in the region of the dislodged media piece.

Many of the media holding bays within the autochanger are arranged in columns and have separate light sensors associated with each column. One problem encountered with using a separate light sensor with each column is that the light beams fan out from their sources. Therefore, as the number of media holding bays in the columns increases, the amount that the light beams fan increases. The increased fanning of the light beams increases the sizes of each light beam associated with each column. These large light beams cause problems with cross talk between individual light sensors. For example, light emitted by a first emitter associated with a first column may be detected by a second receiver associated with a second column. If a media piece located in the second column becomes dislodged, the second receiver may still receive light from the first emitter. Accordingly, the autochanger will not detect the dislodged media piece and may drive the picker into the dislodged media piece.

Another problem with a fanning light beam is that the intensity of the light beam significantly attenuates from the source. Accordingly, as the distance between an emitter and a detector increases, the intensity of light received by the receiver decreases. In addition, the intensity of the light may vary throughout the light beam. This presents problems in the detection of the light emitted by the emitter. For example, circuitry that monitors the output of the receiver may have a threshold wherein an output above the threshold indicates that the light beam has not been disrupted and an output below the threshold indicates that the light beam has been disrupted. The reduced intensity of light in the fanned light beam requires that the threshold be set relatively low. Another problem occurs if an emitter becomes misaligned, even by a relatively small amount relative to its corresponding receiver. The misalignment may cause the receiver to receive light from a portion of the light beam that has a relatively low intensity. Accordingly, the output of the receiver may not be greater than the threshold, which will cause a false indication that the light beam has been disrupted and that a media piece has become dislodged.

A need exists for a peripheral device that overcomes some or all of these problems.

SUMMARY

A light emitter is disclosed herein. An embodiment of the light emitter comprises a tube, a first aperture, a second aperture, a lens, a base mechanism, and a light path. The tube has a first end and a second end. The first aperture is located proximate the tube first end and the second aperture is located proximate the tube second end. The lens is located within the tube. The base mechanism is attached to the tube first end and has a cavity formed therein. The light path extends between the cavity and the second aperture and passes through the first aperture and through the lens.

DETAILED DESCRIPTION

Figure 1:
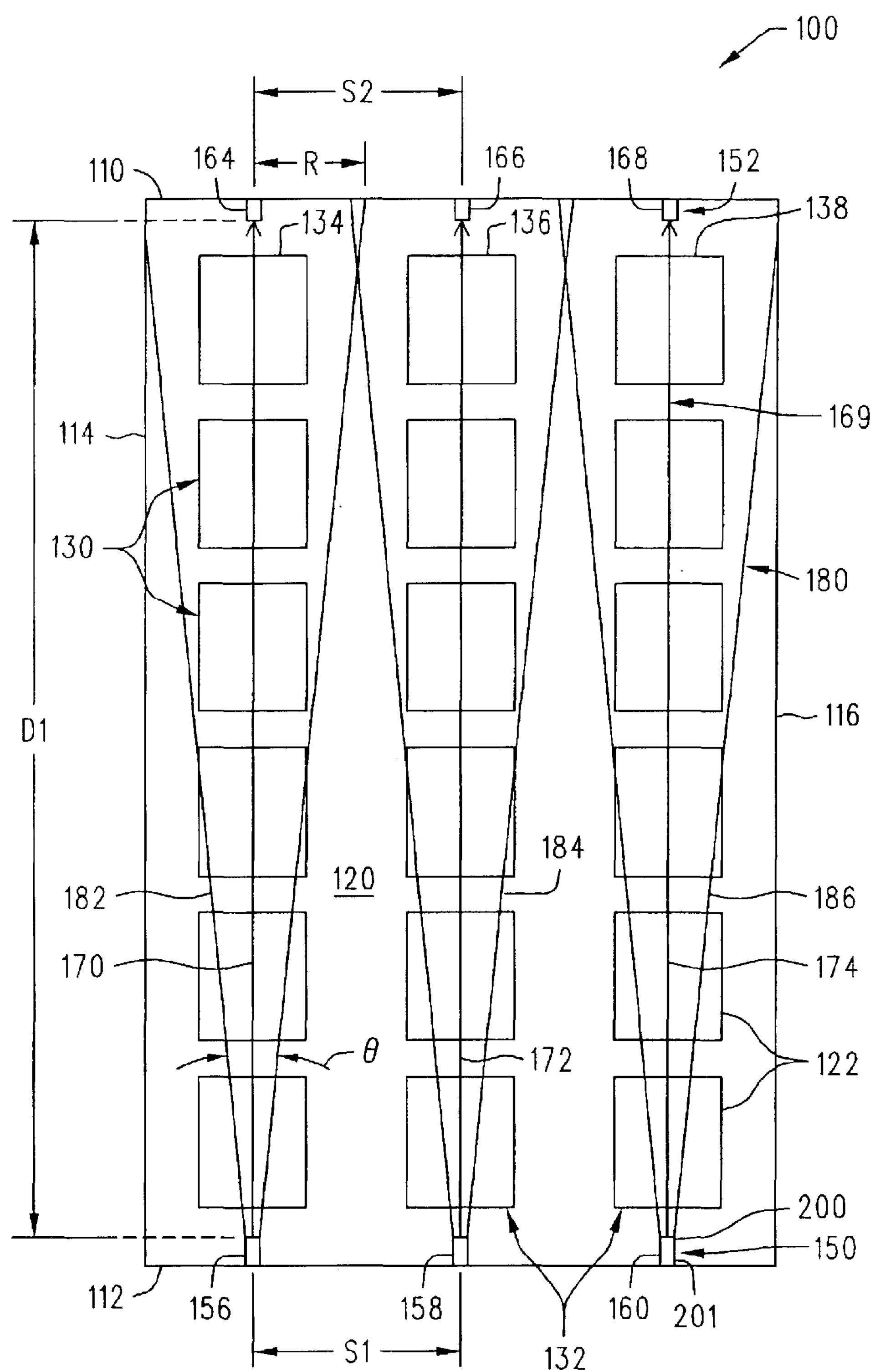
FIG. 1 is a schematic illustration of an embodiment of an autochanger having a plurality of light sensors incorporated therein.

FIGS. 1 through 5, in general, illustrate a light emitter 150 comprising a tube 190 having a light input end 201

(sometimes referred to herein as the input end or the first end) and a light output end 200 (sometimes referred to herein as the output end or the second end). The tube 190 has a first aperture 220 located proximate the tube input end 200 and a second aperture 219 located proximate the tube output end 201. A lens 210 is located in the tube 190. A base mechanism 192 having a cavity 198 formed therein is attached to the tube input end 201. A light path 170 extends between the cavity 198 and the second aperture 219 and through the first aperture 220 and the lens 210.

FIGS. 1 through 5 also, in general, illustrate a light sensor comprising a light emitter 150, a light receiver 152, and a light path 169, 170. The light emitter 150 may comprise a tube 190 having an input end 201 and an output end 200. A first aperture 220 is located proximate the tube input end 200 and a second aperture 219 is located proximate the tube output end 200. A lens 210 is located in the tube 190. A base mechanism 192 having a cavity 198 formed therein is attached to the tube input end 201. The light receiver 152 is located a distance from the light emitter 150 and comprises at least one photodetecting element (not shown). The light path 169, 170 extends between the cavity 198 and the light receiver 152, wherein the light path 169, 170 passes through the tube first aperture 220, through the lens 210, through the tube second aperture 219, and to the light receiver 152.

FIGS. 1 through 5 also, in general, illustrate an autochanger 100 that may comprise at least one media holding bay 122. The autochanger 100 may have a light emitter 150 comprising a tube 190 having an input end 201 and an output end 200, wherein a first aperture 220 is located proximate the tube input end 201 and a second aperture 219 is located proximate the tube output end 200. A lens 210 may be located in the tube 190. A base mechanism 192 having a cavity 198 formed therein may be attached to the tube input end 201. A light source 230 may be located in the cavity 198 adjacent the first aperture 220. A light receiver 152 may also be located in the autochanger 100. A light path 169, 170 may extend between the light emitter 150 and the light receiver 152, wherein the light path 169, 170 is adjacent the at least one media holding bay 122.

Having generally described the autochanger 100 and the light emitters 150, they will now be described in greater detail.

Referring to FIG. 1, the light emitters 150 are described herein as being located within an autochanger 100. A front, schematic illustration of a simplified autochanger 100 is shown in FIG. 1. It is to be understood that the autochanger 100 described herein is for illustration purposes only and that the light emitters 150 and other inventive concepts described herein are applicable to other devices, including other autochangers. Except for the inventive concepts described herein, the autochanger 100 may, as a non-limiting example, be substantially similar to an autochanger commercially available as model C-1700 from the Hewlett-Packard Company of Palo Alto, Calif.

The autochanger 100 may have an upper portion 110, a lower portion 112, a left portion 114, and a right portion 116. The above-described portions define the boundaries of a surface 120 having a plurality of media holding bays 122 formed therein. The media holding bays 122 may be cavities appropriately sized and shaped to retain media pieces (not shown in FIG. 1) used by the autochanger 100. For example, the media pieces may be transported between the media holding bays 122 and a media player (not shown). The media player may serve to write data to and read data from the media pieces in a conventional manner. The media holding bays 122 may be arranged to form a plurality of rows 130 and columns 132. In the non-limiting embodiment described herein, the autochanger 100 has six rows 130 and three columns 132. The columns 132 are individually referenced as a first column 134, a second column 136, and a third column 138.

A plurality of light emitters 150 may be attached to the autochanger 100 in the proximity of the lower portion 112 and below the columns 132. More specifically, one light emitter 150 may be located below each column 132. A corresponding light receiver 152 may be located above each of the columns 132. For example, the light receivers 152 may be attached to the autochanger 100 in the proximity of the upper portion 110. The light emitters 150 may be spaced a distance S1 from each other and the light receivers 152 may each be spaced a distance S2 from each other. The distance S1 and the distance S2 may be substantially equal and may, as an example, be approximately 7.5 inches. The light emitters 150 and the light receivers 152 may be separated by a distance D1, which may, as an example, be approximately five feet.

The light emitters 150 are referenced individually as a first light emitter 156, a second light emitter 158, and a third light emitter 160. The light receivers 152 are referenced individually as a first light receiver 164, a second light receiver 166, and a third light receiver 168. A plurality of light paths 169 may extend between the light emitters 150 and the light receivers 152 and may be located adjacent the columns 132. More specifically, a first light path 170 may extend between the first light emitter 156 and the first light receiver 164 and may be located adjacent the first column 134. A second light path 172 may extend between the second light emitter 158 and the second light receiver 166 and may be located adjacent the second column 136. A third light path 174 may extend between the third light emitter 160 and the third light receiver 168 and may be located adjacent the third column 138. As will be described in greater detail below, the light emitters 150 may emit light beams 180 that follow the light paths 169. More specifically, the first light emitter 156 may emit a first light beam 182 along the first light path 170, the second light emitter 158 may emit a second light beam 184 along the second light path 172, and the third light emitter 160 may emit a third light beam 186 along the third light path 174.

Figure 2:
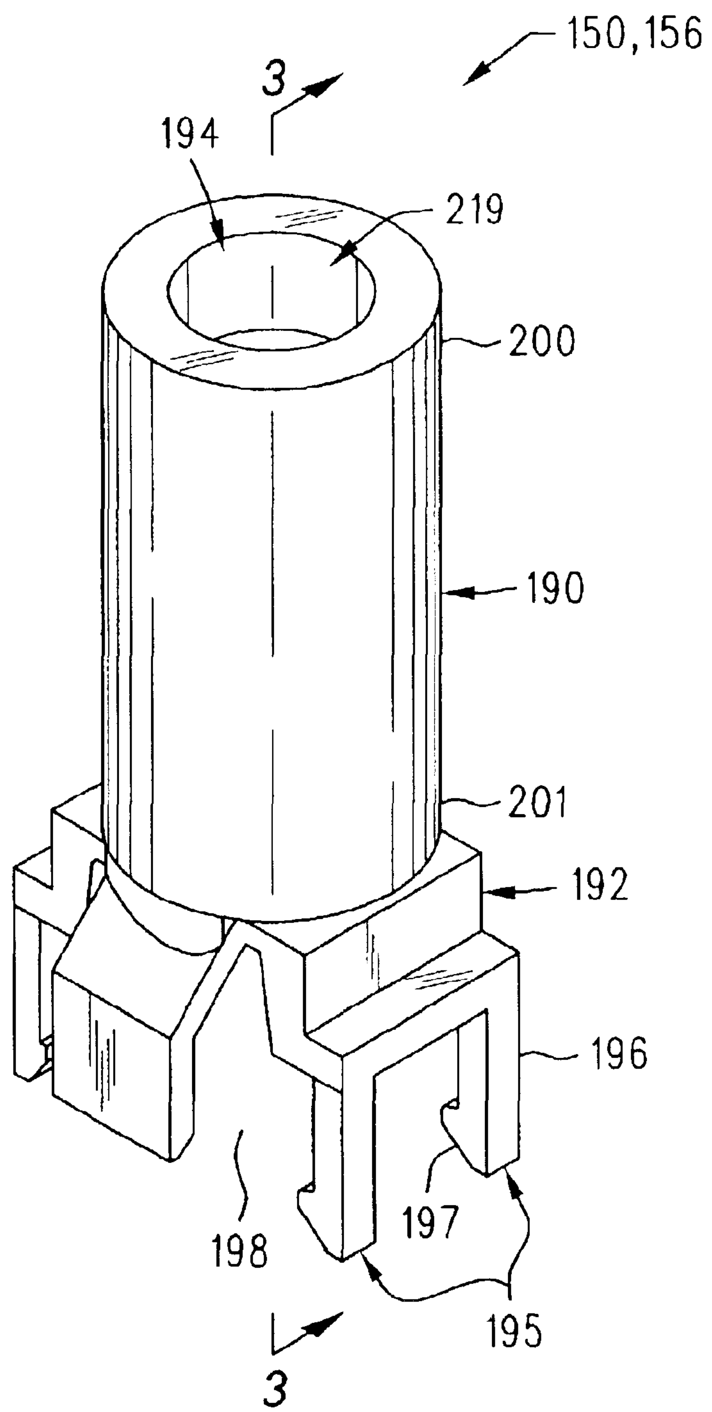
FIG. 2 is a top perspective view of an embodiment of a light emitter used within the autochanger of FIG. 1.

A non-limiting example of the first light emitter 156 is illustrated in FIG. 2. The first light emitter 156 is similar to all the light emitters 150, FIG. 1, and is used herein to illustrate all the light emitters 150, FIG. 1. The first light emitter 156 may have a tube 190 attached to a base mechanism 192. The tube 190 may have a cavity or a hole 194 extending therethrough and may be substantially cylindrical. The base mechanism 192 may have a plurality of mounting tabs 195 attached thereto. Each of the mounting tabs 195 may have a leg 196 with a protrusion 197 extending therefrom. The legs 196 may be flexible and, thus, may deflect upon application of a force. The protrusions 197 may be tapered so as to facilitate their insertion into slots in a conventional manner as described below. The mounting tabs 195 may serve to attach the first light emitter 156 to the lower portion 112, FIG. 1, of the autochanger 100. As is described in greater detail below, the mounting tabs 195 along with the other structures of the base mechanism 192 may be arranged to form a cavity or space 198. The space 198 may be appropriately sized and shaped to accommodate a light source (not shown in FIG. 2), such as a light-emitting diode.

A side, cut away view of the first light emitter 156 is illustrated in FIGS. 3A through 3D. The tube 190 may have a light input end 201, a light output end 200, and an interior surface 202 extending therebetween. The light input end 201 is sometimes referred to herein simply as the input end 201 and the light output end 200 is sometimes referred to herein simply as the output end 200. The interior surface 202 may be relatively dark, e.g., black, so as to absorb light. The interior surface 202 may have a first portion 204 and a second portion 206 formed therein. A junction 208, FIG. 3B, in the form of a step may join the first portion 204 and the second portion 206. The first portion 204 may have diameter D2, which may, as an example, be approximately 7.66 millimeters with a tolerance of approximately 0.1 millimeters. The first portion 204 may also have a length L1, which may, as an example, be approximately 20.90 millimeters with a tolerance of approximately 0.2 millimeters. The second portion 206 may have a diameter D3, which may, as an example, be approximately 8.65 millimeters with a tolerance of approximately 0.1 millimeters. The second portion 206 may also have a length L2, which may, as an example, be approximately 5.0 millimeters with a tolerance of approximately 0.1 millimeters. The junction 208, FIG. 3B, may have a height H1 which is the difference between the diameter D2 and the diameter D3. In the example illustrated above, the height H1 is approximately 0.99 millimeters with a tolerance of approximately 0.1 millimeters.

Figure 3A:
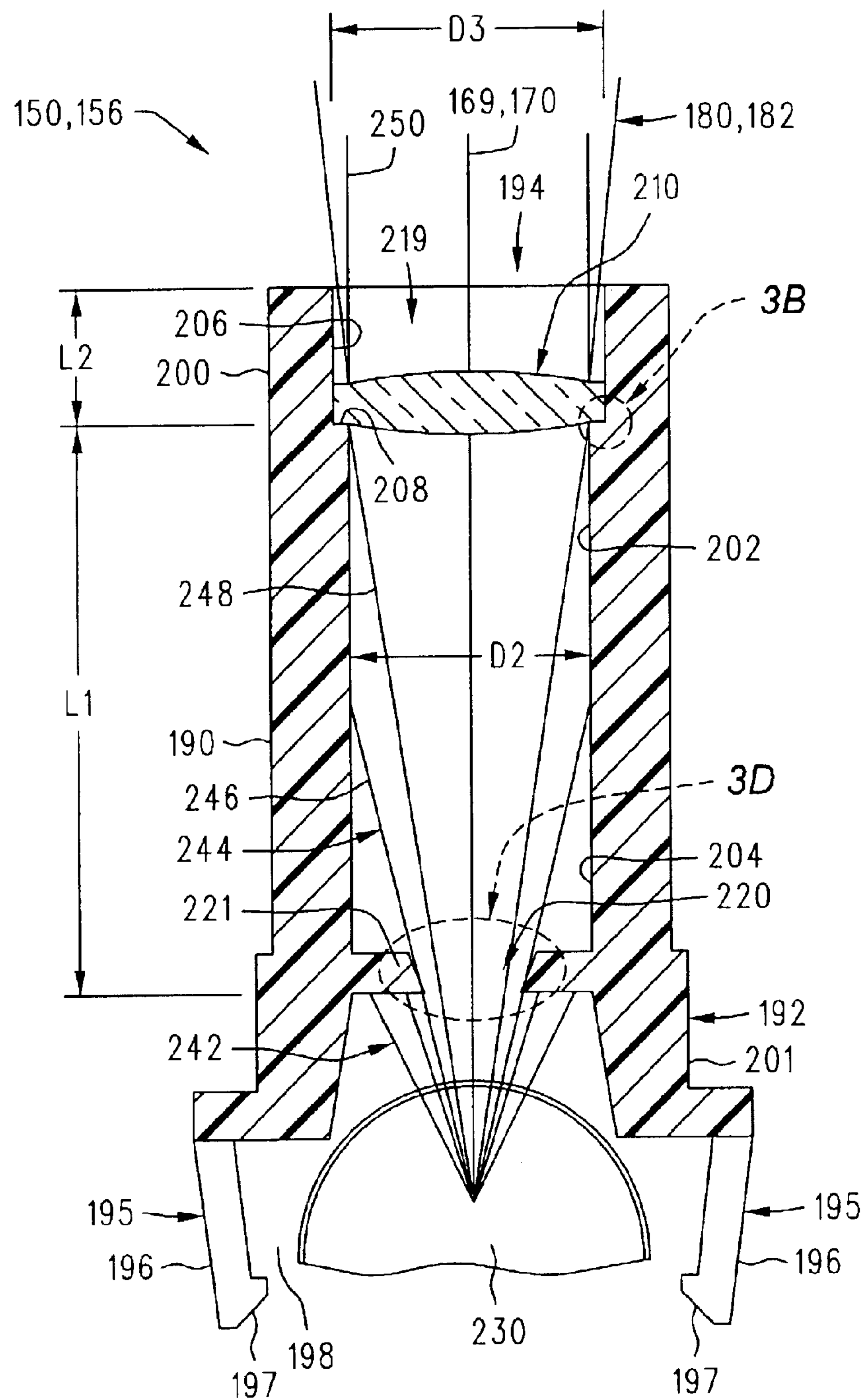
FIG. 3A is a side cut away view of the light emitter of FIG. 2.
Figure 3B:
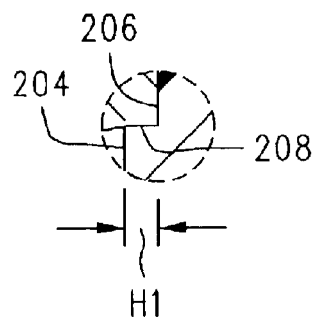
FIG. 3B is an exploded view of a portion of the light emitter of FIG. 3A.
Figure 3C:
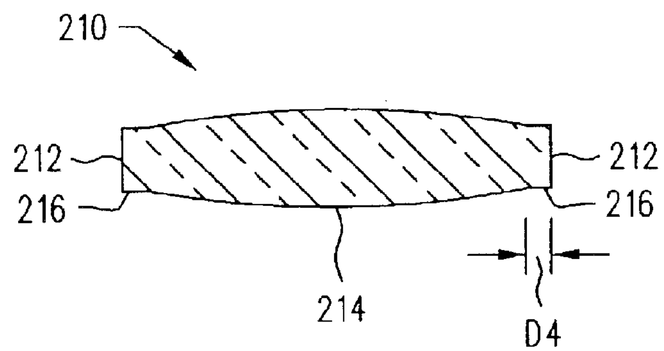
FIG. 3C is a detailed view of an embodiment of the lens of FIG. 3A.

A lens 210 may be located in the second portion 206 of the tube 190 and may abut the junction 208. The lens 210 may be a symmetrical convex lens having a back focal length of approximately 22.5 millimeters. Referring briefly to FIG. 3C, the lens 210 may have an edge 212, a convex surface 214, and a substantially flat surface 216. The flat surface 216 may extend around the circumference of the lens 210 and may extend a distance D4 between the edge 212 and the convex surface 214. The distance D4 may be appropriately sized to abut the junction 208, FIG. 3B, between the first portion 204 and the second portion 206 of the tube 190. For example, the distance D4 may be slightly greater than the height H1. The lens 210 may, as an example, be of the type commercially available from U.S. Precision Lens of Cincinnati, Ohio as part number 7307-00-001. It should be noted that other types of lenses may be used within the tube 190 depending on the application of the light emitters 150.

Figure 3D:
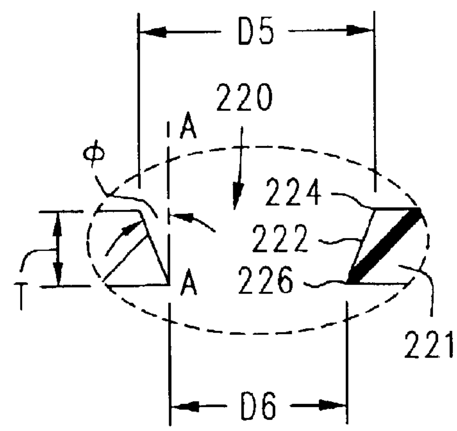
FIG. 3D is a detailed view of a portion of the light emitter of FIG. 3A.

A first aperture 220 may be formed in the input end 201 of the tube 190. The first aperture 220 may be formed so as to limit or otherwise restrict light that passes from the space 198 into the tube 190. An exploded view of the first aperture 220 is illustrated in FIG. 3D. The first aperture 220 may be formed into an end piece 221 of the tube 190, wherein the end piece 221 has a thickness T. The thickness T may, as an example, be approximately 1.5 millimeters. As illustrated in FIG. 3D, the first aperture 220 may have a conical surface 222 formed between an inner edge 224 and an outer edge 226. A diameter D5 of the inner edge 224 may be larger than a diameter D6 of the outer edge 226. The characteristics of the first aperture 220 may be defined by the diameters D5 and D6, wherein the diameter D5 may, as an example, be approximately 3.73 millimeters with a tolerance of approximately 0.1 millimeters. The diameter D6 may, as an example, be approximately 2.00 millimeters with a tolerance of approximately 0.1 millimeters. Alternatively, the characteristics of the first aperture 220 may be defined by an angle $\phi$ formed in the first aperture 220. For example, an axis AA may extend axially in the hole 194 and may intersect the surface 222 at the angle $\phi$. The angle $\phi$ may, as an example, be approximately 35.8 degrees.

Referring again to FIG. 3A, a light source 230, e.g., a light-emitting diode, may be located within the space 198. When the first light emitter 156 is in use, the light source 230 emits light 242 that is semi-omni directional as shown in FIG. 3A. Only the light 244 that propagates in the general direction of the output end 200 of the tube 190 will pass through the first aperture 220. Most of the remaining light will be absorbed by the end piece 221 of the tube 190 as well as components of the base mechanism 192. Some of the light 244 that passes through the first aperture 220, however, will not be directed toward the output end 200. This light is referenced as light 246 and, as shown in FIG. 3A, will intersect and be absorbed by the first portion 204 of the interior surface 202. The light that is directed toward the output end 200 of the tube 190 is referenced herein as the incident light 248 and will intersect the lens 210. The incident light 248 is substantially collimated or otherwise focused by the lens 210 to yield the first light beam 182, which was described above with reference to the autochanger 100 of FIG. 1. The first light beam 182 follows the first light path 170, which may extend axially from the light source 230 and through the tube 190.

The degree to which the first light emitter 156 collimates or otherwise focuses the first light beam 182 is dependent on the physical characteristics of the first light emitter 156, including the lens 210. For example, the degree to which the first light beam 182 is collimated may be changed by varying the focal length of the lens 210, the diameters D2, D3 of the tube 190, the diameters D5, D6 of the first aperture 220, and the lengths L1, L2. Referring again to FIG. 1, in the example cited herein, the first light beam 182 is focused so as to have a radius of approximately 2.5 inches at a distance of five feet. Accordingly, an area in the vicinity of the first light receiver 164 having a diameter of approximately 2.5 inches will be illuminated. The intensity of the first light beam 182 may be substantially constant throughout the radius if the light emitted by the first light emitter 156 is substantially constant. As will be described below, the first light receiver 164 will detect substantially the same intensity of light regardless of the portion of the first light beam 182 that intersects the first light receiver 164.

Having described the light emitters 150, the operation of the autochanger 100 with the light emitters 150 incorporated therein will now be described.

Figure 4:
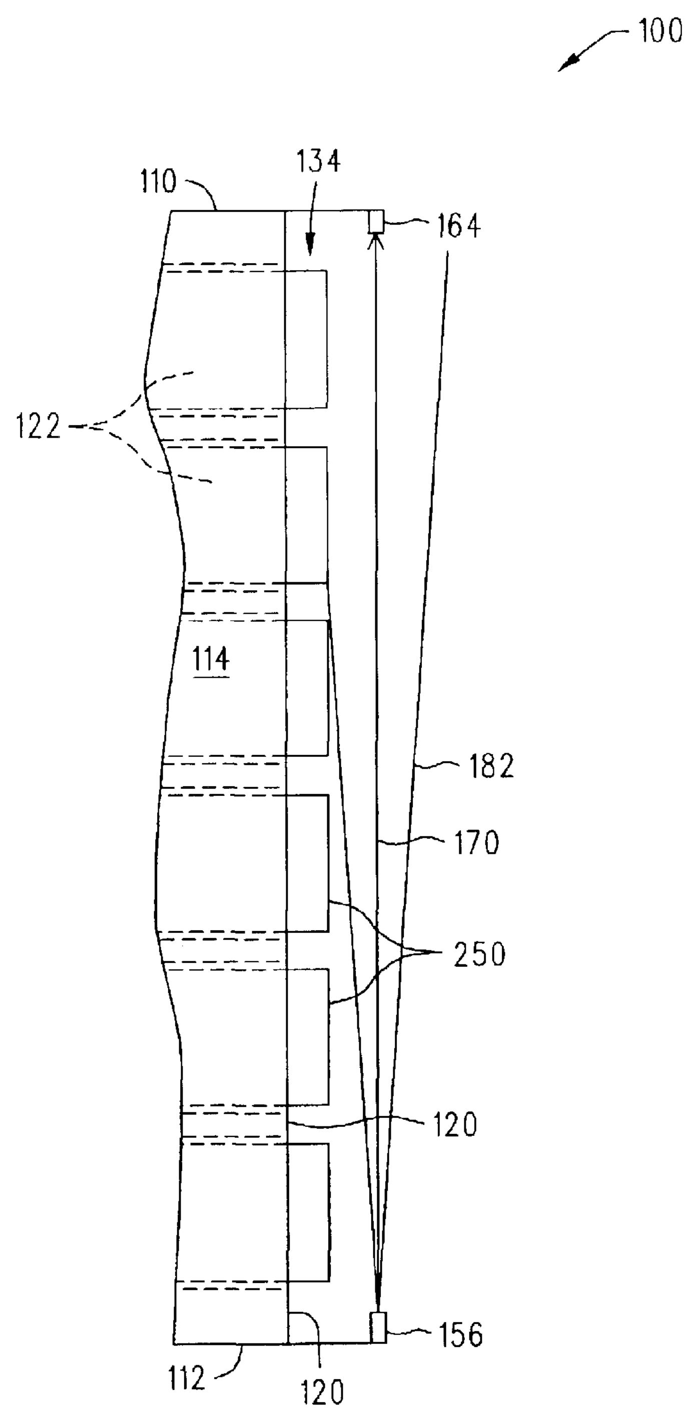
FIG. 4 is a side schematic illustration of the autochanger of FIG. 1 with all the media pieces properly located within their respective media holding bays.

As described above, each of the light emitters 150 has a light path 179 associated therewith. Each of the light paths 179 is located adjacent a column 132 of media holding bays 122. The association of the light paths 179 relative to the columns 132 is illustrated in greater detail by FIG. 4, which is a side view of the autochanger 100. FIG. 4 illustrates a plurality of media pieces 250 located in the media holding bays 122 of the first column 134 which is representative of all the columns 132, FIG. 1, For illustration purposes, the media pieces 250 are shown extending from the surface 120 of the autochanger 100. It is to be understood, however, that the media pieces may be recessed in the autochanger 100 behind the surface 120. As illustrated in FIG. 4, the first light path 170 extends between the first light emitter 156 and the first light receiver 164. The first light emitter 156 emits the first light beam 182, which follows the first light path 170 to the first light receiver 164 and illuminates the first light receiver 164 and its surrounding area.

The first light receiver 164 may have at least one photodetecting element (not shown) located therein. The photodetecting element is illuminated by the first light beam 182 and outputs a signal indicative of the illumination. For example, the photodetecting device and, thus, the first light receiver 164, may output a voltage that is representative of the intensity of light it receives. A processor (not shown)

may compare the output of the photodetecting element to a threshold value. If the value output from the first light receiver 164 is greater than the threshold value, an indication that the first light beam 182 was detected by the first light receiver 164 is transmitted to a processor within the autochanger 100.

This detection of the first light beam 182 by the first light receiver 164 is indicative of no obstructions blocking the first light path 170. The processor may conclude that all the media pieces 250 are properly retained within their respective media holding bays 122. Accordingly, a media handling device (not shown) may move along the first column 134 without colliding with a media piece. It should be noted that the first light path 170 may be located closer to the surface 120 of the autochanger 100 than the media handling device. This will assure that any dislodged media pieces 250 are detected before the media handling device collides with them.

Figure 5:
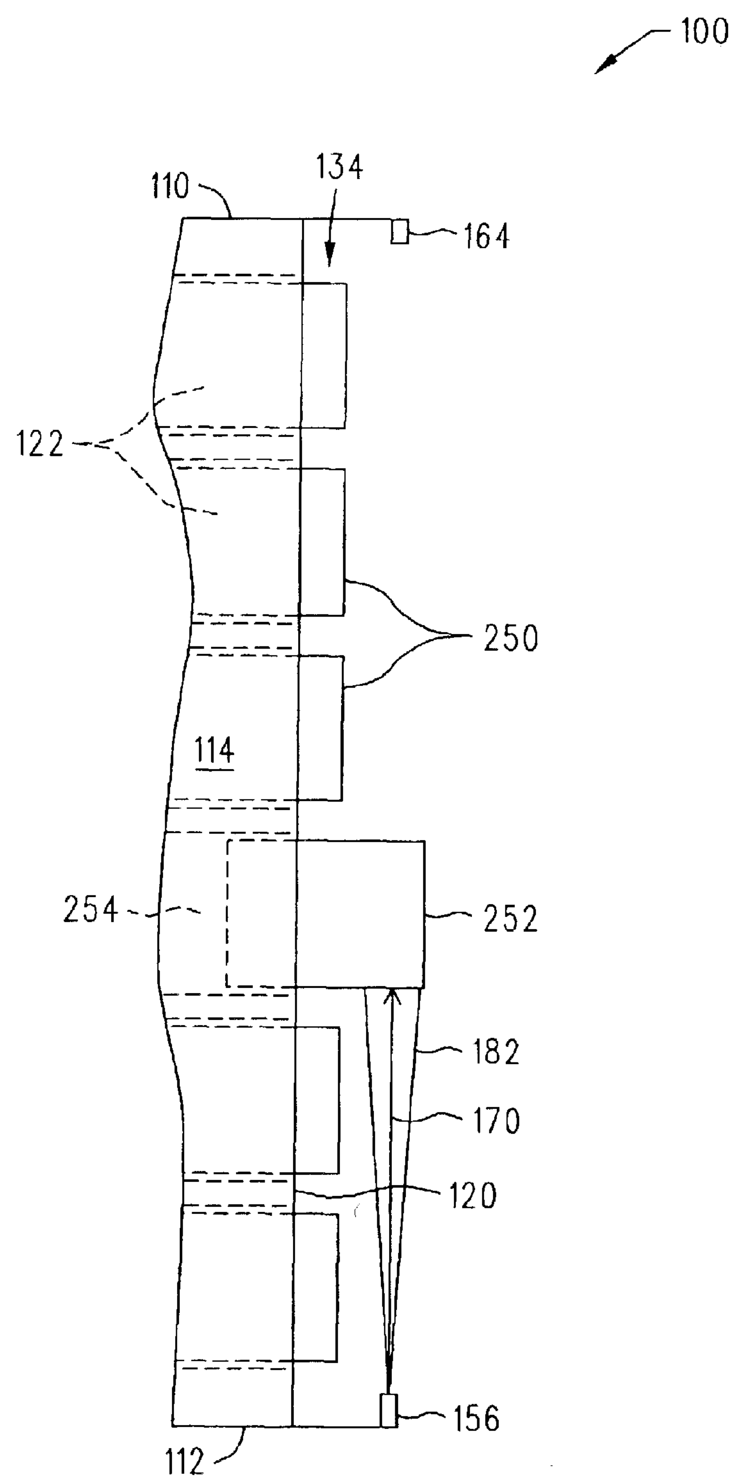
FIG. 5 is a schematic illustration of the autochanger of FIG. 4 with a media piece dislodged from its media holding bay.

An example of detecting a dislodged media piece 252 is illustrated in FIG. 5. In the example illustrated in FIG. 5, the media piece 252 has become dislodged from its media holding bay 254 and is extending a substantial distance from the surface 120 of the autochanger 100. The media piece 252 blocks the first light path 170, which blocks the first light beam 182 from reaching the first light receiver 164. The aforementioned processor identifies the lack of light at the first light receiver 164 as an obstruction of the first light path 170. Accordingly, the autochanger 100 prevents the media handling device from operating along the first column 134 to prevent it from colliding with the media piece 252. It should be noted that the lack of light detected by the first light receiver 164 is an indication that an improper object is located adjacent the first column 134. The object described herein is, for illustration purposes, the media piece 252.

Referring again to FIG. 1, all of the light emitters 150 function in substantially the same manner as the first light emitter 156 described with reference to FIGS. 4 and 5. When the autochanger 100 is in use, the light emitters 150 each emit a light beam 180. More specifically, the first light emitter 156 emits a first light beam 182, the second light emitter 158 emits a second light beam 184, and the third light emitter 160 emits a third light beam 186. Each of the light beams 180 may have an angle θ associated therewith, wherein the angle θ is representative of the amount of fanning of the light beams 180. The angle θ may, as an example, be approximately 4.8 degrees. In the examples used herein, the angle θ results in the light beams 180 each having a radius of approximately 2.5 inches at the upper portion 110 of the autochanger 100. The spacing S2 between the light receivers 152 should be greater than the radius R so that the light beams 180 only intersect their appropriate light receivers 152. For example, if the radius R was greater that the spacing S2, both the first light beam 182 and the second light beam 184 would intersect the first light receiver 164. Accordingly, if a media piece from the first column 134 becomes dislodged, it will not be able to be detected because light will continue to be received by the first light receiver 164 from the second light beam 184.

The radius R is a function of the angle θ and, as described above, is dependent on the physical characteristics of the light emitter 150. As described above, the radius R should be small enough so that each of the light receivers 152 only receives light from a single light beam 180. The radius R, however, should be large enough to provide for manufacturing tolerances within the autochanger 100. For example, the radius R should be large enough so that the light paths 179 do not have to be precisely aligned between the light emitters 150 and the light receivers 152. A requirement for precise alignment may cause failures if the light emitters 150 are jarred or otherwise moved out of position, which prevents the light paths 179 from intersecting the light receivers 152.

In addition to partially collimating the light beams 180, the physical characteristics of the light emitters 150 provides for light beams 180 that have substantially uniform intensity throughout their radii R. Therefore, the light receivers 152 receive substantially the same intensity of light regardless of the portions of the light beams 180 that intersect the light receivers 152. This substantially consistent light intensity alleviates the need for low level comparisons of the signals generated by the light receivers 152 to determine if the first light beam 182 was received. Therefore, noise inherent in the system is less likely to affect the determination as to whether light was received by the light receivers 152.

Having described an embodiment of the autochanger 100 incorporating the light emitters 150, other embodiments will now be described.

Referring to FIGS. 1 and 3, in one embodiment, the light emitters 150 are physically attached to the lower portion 112 of the autochanger 100. The lower portion 112 may have a plurality of slots (not shown) located in the proximity of each of the light emitters 150 that correspond to the locations of the mounting tabs 195. The bases 192 of the light emitters 150 may be pressed against the upper portion 110 so that the mounting tabs 195 pass through the slots and secure the light emitters 150 to the upper portion 110. More specifically, the legs 196 may deflect slightly to allow the protrusions 197 to pass through the slots. The protrusions 197 then serve to retain the light emitters 150 against the lower portion 112 of the autochanger 100. This attachment of the light emitters 150 to the lower portion 112 reduces the assembly time of the autochanger 100 and may allow for existing autochangers 100 to be readily retrofit with the light emitters 150.

In another embodiment of the autochanger 100, the light emitters 150 have lenses 210 that are asymmetrical. The radius of the side of the asymmetric lens facing the light source 230 is different that the radius facing the output end 200 of the tube 190. The asymmetrical lenses 210 provide for greater flexibility with regard to focusing the light beams 180.

In another embodiment of the autochanger 100, the light sources 230 emit light having a preselected band of wavelengths. The light receivers 152 may have filters placed over them that filter out light not having the preselected band of wavelengths. This preselected band of wavelengths lessens the likelihood that other light sources will be detected by the light receivers 152. For example, external light sources may not have the intensity within the preselected bandwidth to be detected by the light receivers 152 and, thus, will not interfere with the operation of the autochanger 100.

The autochanger 100 has been illustrated herein with the light emitters 150 and the light receivers 152 located in close proximity to the surface 120 of the autochanger 100. This close proximity is used to assure that the light paths 179 are also located in close proximity to the surface 120 and thus, the media holding bays 122. In another embodiment of the autochanger 100, the light emitters 150 and the light receivers 152 may be located away from the surface 120. The light paths 179 may be directed to the proximity of the surface 120 and, thus, the media holding bays 122 by the use of reflective devices, such as mirrors.

It should also be noted that the light emitters 150 and the light receivers 152 may be located in virtually any location within the autochanger 100. For example, they may be located so that the light beams 180 are directed across the rows 130 of media holding bays 122.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A light emitter comprising:

a tube having a first end and a second end;

a first aperture located proximate said tube first end;

a second aperture located proximate said tube second end;

a lens located within said tube;

a base mechanism attached to said tube first end, said base mechanism having a cavity formed therein; and a light path extending between said cavity and said second aperture, said light path passing through said first aperture and through said lens.

2. The light emitter of claim 1 and further comprising a light source located within said base mechanism cavity, said light source being intersected by said light path.

3. The light emitter of claim 1, wherein said first aperture is smaller than said second aperture.

4. The light emitter of claim 1, wherein said first aperture is formed by a member that partially encloses said tube first end.

5. The light emitter of claim 4, wherein said member has a first side facing said tube first end and a second side facing away from said tube first end, wherein said first aperture is conical, the portion of said first aperture on said member first side being smaller than the portion of said aperture on said member second side.

6. The light emitter of claim 1, wherein said lens is a collimating lens.

7. The light emitter of claim 1, wherein said lens is a symmetrical convex lens.

8. The light emitter of claim 1, wherein said lens is an asymmetrical convex lens.

9. The light emitter of claim 1, wherein said lens has a focal length associated therewith and further comprising a light source, wherein said light source is located at a preselected location relative to said lens focal length.

10. The light emitter of claim 1, wherein said tube has an inner surface, said inner surface having a first portion and a second portion, wherein the diameter of said first portion is different than the diameter of said second portion, and wherein the junction of said first portion and said second portion forms a step.

11. The light emitter of claim 10, wherein said lens abuts said step.

12. The light emitter of claim 10, wherein said lens has a lens surface and a lens edge abutting said lens surface, said lens surface having a flat circumference portion extending from said lens edge, and wherein said lens flat circumference portion abuts said step.

13. The light emitter of claim 10, wherein said tube first portion has a length of about 20.9 millimeters.

14. The light emitter of claim 10, wherein said tube second portion has a length of about five millimeters.

15. The light emitter of claim 10, wherein said diameter of said tube first portion is about 7.66 millimeters.

16. The light emitter of claim 10, wherein said diameter of said tube second portion is about 8.65 millimeters.

17. The light emitter of claim 1, wherein said lens has a focal length of about 22.5 millimeters.

18. A light sensor comprising:

a light emitter comprising:

a tube having a first end and a second end;

a first aperture located proximate said tube first end;

a second aperture located proximate said tube second end;

a lens located within said tube;

a base mechanism attached to said tube first end, said base mechanism having a cavity formed therein;

a light receiver; and a light path extending between said cavity and said receiver, wherein said light path passes through said tube first aperture, through said lens, and through said tube second aperture.

19. The light sensor of claim 18, wherein said cavity has a light source located therein and wherein said light path intersects said light source.

20. The light sensor of claim 19, wherein said light source is adapted to emit light having a preselected band of wavelengths and wherein said light receiver is adapted to detect light having said preselected band of wavelengths.

21. The light sensor of claim 20 and further comprising a light filter located in said light path, said light filter being adapted to pass light having said preselected band of wavelengths.

22. The light sensor of claim 18, wherein said first aperture is smaller than said second aperture.

23. The light sensor of claim 18 wherein said first aperture is formed by a member that partially encloses said tube first end.

24. The light sensor of claim 23 wherein said member has a light side facing said tube first end and a second side facing away from said tube first end, wherein said first aperture is conical, the portion of said first aperture on said member first side being smaller than the portion of said first aperture on said member second side.

25. The light sensor of claim 18, wherein said lens is a collimating lens.

26. The light sensor of claim 18, wherein said lens is a symmetrical convex lens.

27. The light sensor of claim 18, wherein said lens is an asymmetrical convex lens.

28. The light sensor of claim 18, wherein said lens has a focal length associated therewith and further comprising a light source located at a preselected location relative to said lens focal length.

29. The light sensor of claim 18, wherein said tube has an inner surface, said inner surface having a first portion and a second portion, wherein the diameter of said first portion is different than the diameter of said second portion, and wherein the junction of said first portion and said second portion forms a step.

30. The light sensor of claim 29, wherein said lens abuts said step.

31. The light sensor of claim 29, wherein said lens has a lens surface and a lens edge abutting said lens surface, said lens surface having a flat circumference portion extending from said lens edge, and wherein said lens flat circumference portion abuts said step.

32. An autochanger comprising:

at least one media holding bay;

a light emitter comprising:

a tube having a first end and a second end;

a first aperture located proximate said tube first end;

a second aperture located proximate said tube second end;

a lens located in said tube;

a base mechanism attached to said tube first end, said base mechanism having a cavity formed therein;

a light source located in said cavity adjacent said first aperture;

a light receiver; and a light path extending between said light emitter and said light receiver, at least a portion of said light path being adjacent said at least one media holding bay.

33. The autochanger of claim 32, wherein said light source is adapted to emit light having a preselected band of wavelengths and wherein said light receiver is adapted to detect light having said preselected band of wavelengths.

34. The autochanger of claim 33 and further comprising a light filter located in said light path, said light filter being adapted to pass light having said preselected band of wavelengths.

35. The autochanger of claim 32, wherein said first aperture is smaller than said first aperture.

36. The autochanger of claim 32 wherein said first aperture is formed by a member that partially encloses said tube first end.

37. The autochanger of claim 36, wherein said member has a first side facing said tube first end and a second side facing away from said tube first end, wherein said first aperture is conical, the portion of said first aperture on said member first side being smaller than the portion of said aperture on said member second side.

38. The autochanger of claim 32, wherein said lens is a collimating lens.

39. The autochanger of claim 32, wherein said lens is a symmetrical convex lens.

40. The autochanger of claim 32, wherein said lens is an asymmetrical convex lens.

41. The autochanger of claim 32, wherein said lens has a focal length associated therewith and wherein said light source is located at a preselected location relative to said lens focal length.

42. The autochanger of claim 32, wherein said tube has an inner surface, said inner surface having a first portion and a second portion, wherein the diameter of said first portion is different than the diameter of said second portion, and wherein the junction of said first portion and said second portion forms a step.

43. The autochanger of claim 42, wherein said lens abuts said step.

44. The autochanger of claim 42, wherein said lens has a lens surface and a lens edge abutting said lens surface, said lens surface having a flat circumference portion extending from said lens edge, and wherein said lens flat circumference portion abuts said step.

45. An autochanger comprising:

at least one media holding bay;

means for producing a substantially collimated light beam; and means for detecting said substantially collimated light beam; and a light path associated with said substantially collimated light beam extending between said light emitter and said light receiver, at least a portion of said light path being adjacent said at least one media holding bay.

* * * * *

UNITED STATES PATENT AND TRADEMARK OFFICE

CERTIFICATE OF CORRECTION

PATENT NO. : 6,916,112 B2
APPLICATION NO. : 10/612865
DATED : July 12, 2005
INVENTOR(S) : Thomas W Holmquist et al.

It is certified that error appears in the above-identified patent and that said Letters Patent is hereby corrected as shown below:

In column 10, line 33, in Claim 24, delete “light” and insert -- first --, therefor.

Signed and Sealed this

Twenty-eighth Day of July, 2009

JOHN DOLL
*Acting Director of the United States Patent and Trademark Office*